United States Patent [19]

Hoffman et al.

[11] Patent Number: 4,580,052

[45] Date of Patent: Apr. 1, 1986

[54] RADIOACTIVE GAUGING SOURCE SUPPORT, TRANSPORT, AND STORAGE HOLDER

[75] Inventors: Edward J. Hoffman, West Harrison, Ind.; John R. Bublitz, Charlotte, N.C.

[73] Assignee: The Ohmart Corporation, Cincinnati, Ohio

[21] Appl. No.: 477,918

[22] Filed: Mar. 23, 1983

[51] Int. Cl.$^4$ .............................................. G01F 23/00
[52] U.S. Cl. .................................. 250/357.1; 376/245; 376/254; 376/272
[58] Field of Search .................. 242/54 R; 250/357.1, 250/435, 436; 254/278, 245; 376/249, 254, 258, 272; 414/146

[56] References Cited

U.S. PATENT DOCUMENTS

| | | | |
|---|---|---|---|
| 2,972,050 | 2/1961 | Allen | 250/357.1 |
| 3,073,959 | 1/1963 | Jervis | 376/254 |
| 3,353,711 | 11/1967 | Biezunski et al. | 250/357.1 |
| 4,358,682 | 11/1982 | Telfer et al. | 250/357.1 |
| 4,471,223 | 9/1984 | Hurst et al. | 250/357.1 |

Primary Examiner—Deborah L. Kyle
Assistant Examiner—Richard W. Wendtland
Attorney, Agent, or Firm—Wood, Herron & Evans

[57] ABSTRACT

An apparatus and method for supporting plural radioactive sources in operative gauging relationship at different elevations in a vessel containing material and density and/or level of which is to be monitored, and for transporting the radioactive sources to a radiation-proof source holder for storage exteriorly of the vessel when the vessel is being cleaned or the like.

In one embodiment the sources are independently supported on a continuous basis on separate cables and transported between the vessel and the source holder by separate winches associated with the source holder, with each winch independently controlling the transport of its respectively associated source. In a second preferred embodiment, also equipped with two winches and capable of separately suspending plural sources in juxtaposition in the source holder, one of the winches is used to transport a first source from the source holder to an intermediate position in the vessel whereupon its support cable is disconnected from the winch and connected to the lower end of a second cable supporting the other source or sources. The second cable is controlled by the second winch to facilitate simultaneous lowering of the entire assembly of interconnected sources at their proper final locations in the vessel. By reversing the foregoing procedure the winches can be used to transport the sources to the storage holder where they are stored in side-by-side position once again suspended from separate cables.

In both embodiments of the invention, by reason of storage of plural sources on separate cables in side-by-side position in the storage holder, the height of the storage holder is reduced to approximately one-half of the normal requirement.

7 Claims, 7 Drawing Figures

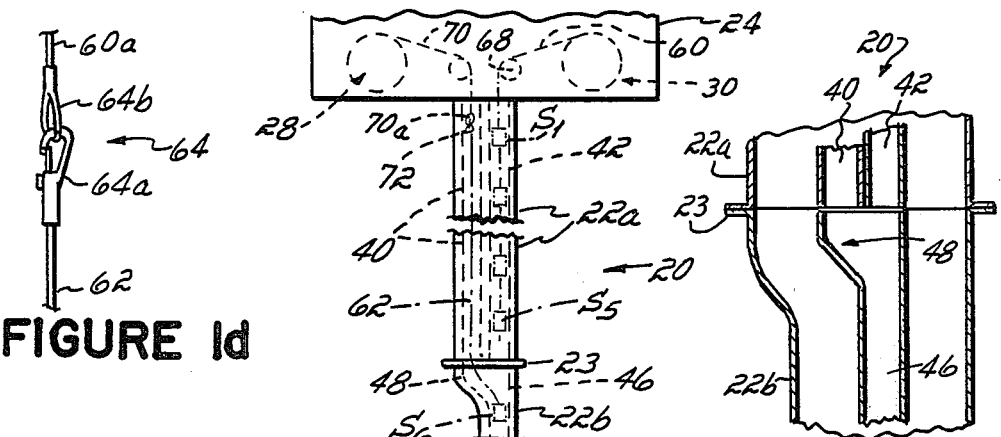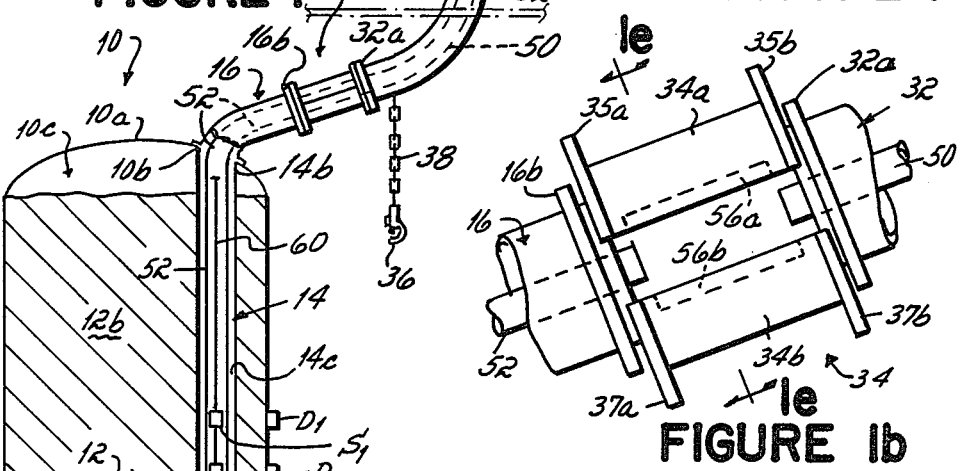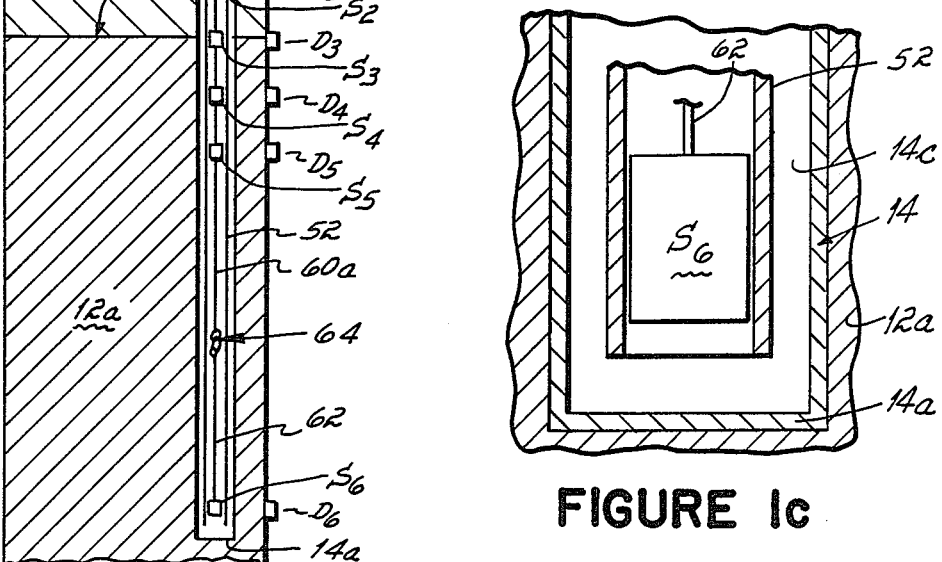

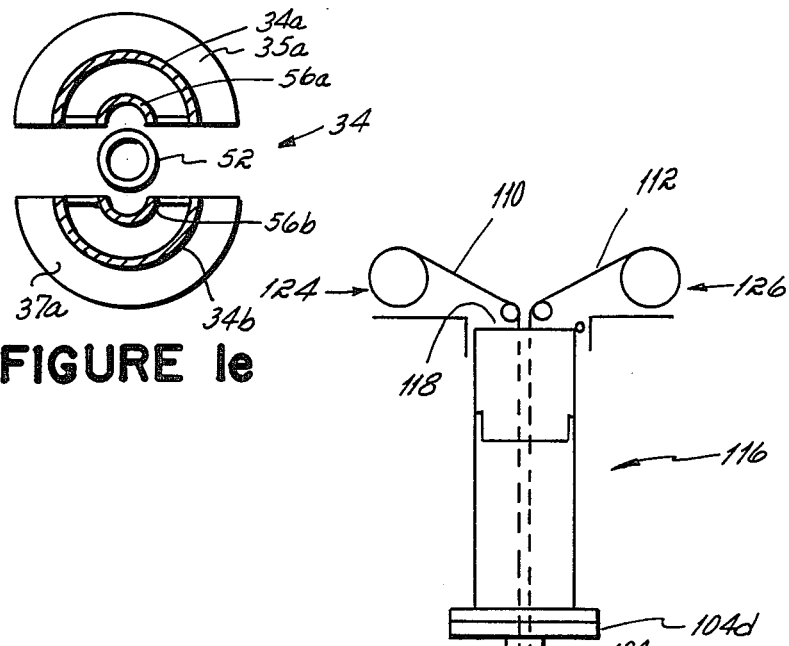
FIGURE 1e
FIGURE 2
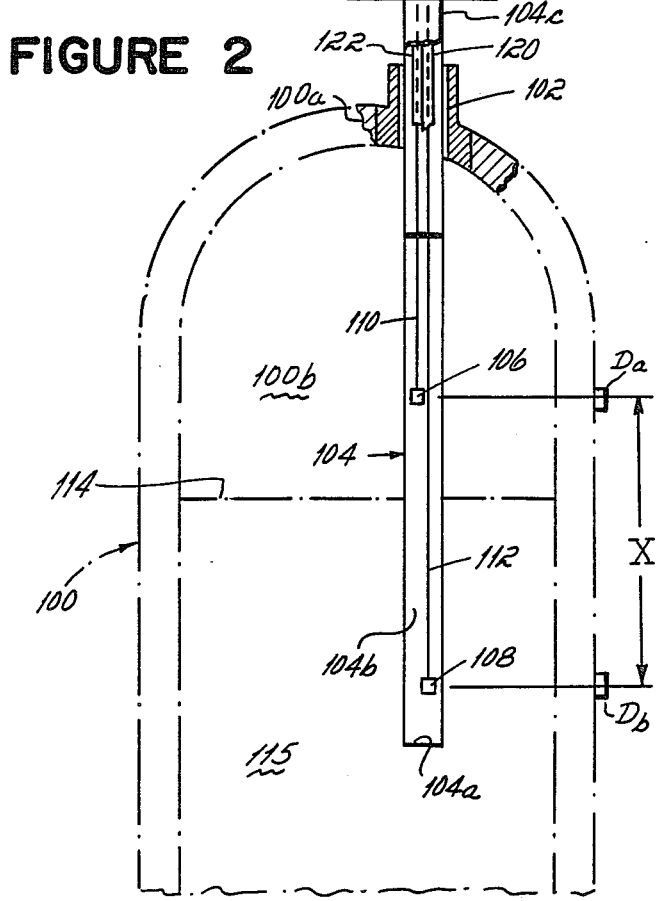

RADIOACTIVE GAUGING SOURCE SUPPORT, TRANSPORT, AND STORAGE HOLDER

This invention relates to gauging systems utilizing radioactive sources, and more particularly to gauging systems which include compact source holders for safely storing radioactive sources when removed from active gauging position within a vessel or the like, the contents of which are measured and/or monitored.

Nuclear gauging techniques utilizing radioactive sources have been used for many years to measure and/or monitor the contents of material stored and/or processed in vessels, containers, and the like. One form of measurement with respect to which nuclear gauging has been found particularly advantageous is the monitoring of the level of the contents of large vessels, such as reactor vessels in synthetic fuel production. In gauging systems of this type plural pairs of radioactive sources and associated detectors are positioned at different elevations relative to the tank. As the level of material in the tank and/or the interface between differing density materials rises or falls, the amount of radiation transmitted to different detectors from their respectively associated sources varies since the material in the tank is inserted or removed, depending upon whether the level is rising or falling, between the detectors and their respective sources. By correlating the outputs of the various detectors, the level of material in a vessel can be monitored.

In gauging applications of the foregoing type, it is sometimes necessary, for maintenance, cleaning, or the like, to remove the radioactive sources from operative gauging relation to the vessel and safely store them outside the vessel in a radiation-proof source holder. With the radioactive sources safely stored outside of the vessel, maintenance personnel can enter the vessel and perform necessary maintenance, cleaning, or the like without risk of harmful radiation exposure from the sources. In the past, radiation-proof source holders have been provided above the vessel. Typically, the length of the radiation-proof source holder measured in a vertical direction was coextensive with the effective length of the radioactive sources, that is, the vertical distance between the uppermost and lowermost sources when operably disposed in gauging position in the vessel. With vessels of great height having an effective source length of substantial magnitude, such as thirty-foot vessels having an effective source length of twenty feet or more, prior art radiation-proof source holders having a length of twenty feet or more are required. Source holders of such length, by reason of their sheer size and weight, are expensive to construct and require special support structures. Additionally, if the vessels are located inside a building, unduly large headroom above the vessel is required, increasing the size of the building necessary to house the vessel and its associated source holder which extends vertically above the vessel.

Accordingly, it has been an objective of this invention to provide a gauging system, including a radiation-proof source holder and an associated source transport for transferring plural sources having a substantial effective length between the source holder and an operative gauging position within the vessel, which is relatively compact, thereby minimizing the cost and complexity of the source holder as well as the necessary support structure and headroom therefor. This objective has been accomplished in accordance with certain principles of the invention by providing in combination with a source holder located above a vessel, means for dividing the plural sources into separate groups and separate transport means respectively associated with the separate source groups for transferring the different groups of sources between a lower gauging position in which the different groups of sources are located in operative position one above the other in the vessel and a storage position in the source holder in which the different groups of sources are stored side-by-side. By reason of the fact that the plural sources are separately grouped for storage and stored in side-by-side relation in the source holder, the vertical dimension of the source holder, which is coextensive with the effective length of the longest of the source groups, is reduced substantially. This, in turn, provides a compact source holder which is lower in cost, simpler to construct and support, and requires less headroom above the vessel.

In accordance with one preferred embodiment of the invention, the sources, which in the gauging position in the vessel are located at substantially different vertical elevations, are independently suspended from separate cables which are respectively controlled with different winches stored in the upper portion of the source holder. With such an arrangement, one source can be located at the bottom of the vessel and the other at the top, which in a large vessel can represent an effective source length of twenty feet or more, yet when the separately suspended sources are stored in side-by-side relation in the source holder by reeling in their respectively associated cables with the separately associated winches, the vertical dimension of the source holder required is approximately coextensive with the length of a single source.

In accordance with another preferred embodiment of the invention, which also utilizes separate winches, a selectively removable access panel and associated temporary source support are located between the lower end of the source holder and the top of the vessel. With this arrangement, the separate sources are supported in side-by-side relation in the source holder by separate cables controlled from the separate winches. When it is desired to lower the sources into operative gauging relation in the vessel, the source which is to be lowermost in the vessel is lowered into an intermediate position in the upper portion of the vessel to a point at which a selectively disconnectable coupling in the cable is positioned in the region of the access panel. The access panel is then removed, the coupling disconnected, and the lower portion of the now disconnected cable which supports the source is connected to the temporary support located at the access region. The other source located in the source holder, which in operative gauging position in the tank is the uppermost source, is then lowered by its associated cable and winch to a point where the lowermost end thereof is in the access region, whereupon the upper end of the cable supporting the lower source is disconnected from the temporary support and connected to the lower end of the cable which supports the uppermost source. The winch associated with the uppermost source is now activated to lower the serially-connected upper and lower sources into operative position in the tank.

When it is desired to store the sources in side-by-side relation in the source holder, the winch supporting the serially-connected sources is activated to raise the sources to a point whereat the coupling between the cables of the upper and lower sources is at the access region. At this point, the upper end of the cable supporting the lower source is disconnected from the lower end of the cable supporting the upper source and the cable supporting the lower source temporarily fastened to the source support at the access region. The winch associated with the upper source is then activated to fully retract the upper source into the source holder. The winch associated with the lowermost source, which source is now supported by the temporary source support at the access region, is activated to lower its associated cable to the access region whereat the cable supporting the lower source is disconnected from the temporary source support and connected to the awaiting cable. The winch is now activated and the lower source retracted into the source holder, placing it in side-by-side relation to the upper source which was previously retracted into the source holder by its winch and cable.

These and other features, advantages, and objectives of the invention will become more readily apparent from a detailed description thereof taken in conjunction with the drawings in which:

FIG. 1 is a vertical elevational view, in cross section, of a first preferred embodiment of the invention, FIG. 1a is an enlarged cross sectional view of the lower section of the source holder, FIG. 1b is an enlarged partially exploded elevational view of the access section of the tube network, FIG. 1c is an enlarged cross sectional view of the lower end of the tubular well of the vessel, FIG. 1d is an enlarged view of the cable coupling assembly, FIG. 1e is an enlarged cross sectional partially exploded view of the access section of the tube network, and FIG. 2 is a vertical elevational view, in cross section, of a second preferred embodiment of the invention.

With reference to FIG. 1, one preferred embodiment of a nuclear gauging system incorporating the principles of this invention is illustrated in association with a vertically disposed vessel 10 of cylindrical cross section which typically has a diameter of 8–10 feet and a height of approximately 50 feet, although these dimensions may vary considerably depending upon the application. The vessel 10, in one particular application involving synthetic fuel production, contains two liquids of dissimilar specific gravity, such as heavy oil 12a and a catalyst 12b, which are separated by a horizontal interface region 12. It is the level, or vertical elevation, of the interface region 12 that the nuclear gauge of the embodiment of FIG. 1, to be described in detail hereafter, is designed to monitor. Vertically disposed within the interior 10c of the vessel 10 is a radioactive source well in the form of a cylinder 14 having a closed lower end 14a and an open upper end 14b. The open upper end 14b of the source well 14 communicates with an opening 10b in the hemispherical top 10a of the vessel 10 to which it is secured by welding or the like. The interior 14c of the radioactive source well 14 is sealed with respect to the contents 12a and 12b of the vessel interior 10c, preventing the contents of the vessel from entering the interior of the radioactive source well.

Operatively located within the radioactive source well 14 in gauging position by means to be described in more detail hereafter, are radioactive sources $S_1$, $S_2$, $S_3$, $S_4$, $S_5$, and $S_6$, such as cesium or cobalt. In a preferred embodiment of the invention the sources $S_1$, $S_2$, $S_3$, $S_4$, $S_5$, and $S_6$, are located, when in their operative gauging position within the well 14, at predetermined spaced apart positions, for example, at distances of 10 feet, 12 feet, 14 feet, 16 feet, 18 feet, and 31 feet, respectively, from the upper end 10a of the vessel 10. Operatively associated with respect to the sources $S_1$, $S_2$, $S_3$, $S_4$, $S_5$, and $S_6$ are a plurality of radiation detectors $D_1$, $D_2$, $D_3$, $D_4$, $D_5$, and $D_6$ disposed in vertical alignment alongside the exterior of the vessel 10. By comparing the outputs of the detectors $D_1$, . . . $D_6$, which are respectively responsive to radiation from sources $S_1$, . . . $S_6$, it is possible to monitor the level, or vertical elevation, of the interface region 12 between the differing specific gravity materials 12a and 12b in the vessel 10. Since the technique of determining the level of the interface 12 using the outputs of the detectors $D_1$, . . . $D_6$ forms no part of this invention, it is not further described.

In accordance with the invention, to safely store the sources $S_1$, . . . $S_6$ when not located in the active or gauging position in the radioactive source well 14, a radiation-proof source holder 20 is provided. The source holder 20, which is stationarily mounted and generally in the form of a vertically disposed cylinder or tube, has an upper relatively long section 22a and a lower relatively short section 22b. The upper end of the upper section 22a is open and communicates with the interior of a housing 24, which contains a pair of stationarily mounted winches 28 and 30 for reasons to become more apparent hereafter. The lower end of the upper section 22a and the upper end of the lower section 22b are in communication with each other at joint 23. The source holder 20 also includes a curved section 32, an access section 34, and a pipe section 16 which are serially interconnected between the lower end of lower section 22b and the opening 10b of vessel top 10a.

The access section 34 consists of two semicylindrical sections 34a and 34b which are secured in place by flanges 35a and 35b and by flanges 37a and 37b, respectively. Flanges 35a and 35b associated with semi-cylindrical section 34a are detachably secured to flange 16b at the upper end of pipe section 16 and flange 32a at the lower end of curved pipe section 32. Flanges 37a and 37b of access section 34b are detachably secured to the flange 16b of pipe section 16 and flange 32a of curved pipe section 32. When the access sections 34a and 34b are in the secured position shown in FIG. 1, the lower end of the curved pipe section 32 is connected to the upper end of the pipe section 16 via the assembled access section 34. Conversely, when the access sections 34a and 34b are detached from the flanges 16b and 32a, the region between the pipe section end 16b and the lower end of the pipe section 32 is accessible, for reasons to become more apparent hereafter. For reasons also to become apparent hereafter, secured to the lower end of the curved pipe section 32 is a temporary fastening member, for example, an eye bolt snap 36 anchored to the end of a chain 38 which has its other end fastened to the lower end of the pipe section 32.

Located within the source holder 20 are a pair of vertical source guide tubes 40 and 42 which are positioned in closely adjacent, juxtaposed, side-by-side relation. Disposed vertically below the guide tube 42 within the lower section 22b is a source guide tube 46. An eccentric reducer 48 located in the upper end of the lower section 22b is positioned between the upper end of the guide tube 46 and the lower ends of the source guide tubes 40 and 42. A curved source guide tube 50 is fixedly secured within the curved tube section 32. Similarly, a source guide tube 52 is fixedly located within the pipe section 16 and depends into the well 14. Semicylindrical source guide tube sections 56a and 56b fixedly mounted in semi-cylindrical access sections 34a and 34b, respectively, cooperate, when the sections 34a and 34b are secured in position as shown in FIG. 1, to provide a cylindrical source guide tube between the upper end of source guide tube 52 and the lower end of source guide tube 50.

To support the sources $S_1, \ldots S_6$ within the source well 14 or the source holder 20, as well as to facilitate transporting the sources between the well and holder, a pair of cables 60 and 62 are provided. In the operative or gauging position of the sources $S_1, \ldots S_6$ located within source guide tube 52 of the radioactive source well 14, the source $S_6$ is suspended at the lower end of the cable 62, while the sources $S_1, \ldots S_5$ are suspended at the desired vertical spacing by the lower portion of the cable 60. The upper end of the cable 62 is connected to the lower end of a leader, or cable section 60a, located below the lowermost source $S_5$ by a detachable coupling, for example, a hook and eyelet connection assembly 64, for reasons to become apparent hereafter. The upper end of the cable 60, contained within serially connected guide tubes 56a–56b, 50, 43 and 42, is connected to the winch 30 via a stationarily mounted pulley 68 anchored to the lower portion of the winch housing 24 proximate the upper end of the guide tube 42.

To transfer the sources $S_1, \ldots S_5$ to the storage position within the guide tube 42 of the source holder 20 as shown by phantom lines, and to transfer the source S6 to the storage position within guide tube 40 illustrated by phantom line, the winch 30 is activated to wind up the cable 60 sufficiently to locate the coupling 64 in the region of the access section 34, at which point the winch 30 is deactivated and the coupling 64 maintained in the region of the access section 34. By reason of the distance between the hook 64a a at the upper end of the cable 62 and the source $S_6$, with the hook 62a proximate the access section 34 the source $S_6$ is located in the upper region of the radioactive source well 14, preventing radiation from the source $S_6$ from reaching the access section 34. Similarly, by reason of the length of the leader 60a between the eye 64b at the lower end of the cable leader 60a and the lowermost source $S_5$, when the eye 64b is in the region of the access section 34 the source $S_5$ is located in the source holder 20, preventing radiation from sources $S_1, \ldots S_5$ from reaching the retion of the access section 34.

With the coupling assembly 64 in the region of access section 34, the semi-cylindrical access sections 34a and 34b are removed, providing access to the hook and eye assembly. The hook 64a at the upper end of the cable 62 is manually disconnected from the eye 64b at the lower end of the cable 60 and the hook 64a connected to the eye bolt snap 36 at the end of the chain 38, temporarily supporting the source $S_6$ within the upper region of source well 14. With the cable 60 supporting sources $S_1$, $\ldots S_5$ now disconnected from the cable 62 supporting the source $S_6$, the winch 30 is again activated to raise the sources $S_1, \ldots S_5$ into their full upward storage position shown in phantom lines, completely retracted into guide tube 42 of the upper section 22a of the source holder 20, at which point the winch 30 is deactivated and the sources $S_1, \ldots S_5$ remain within the upper section of the source holder.

After the sources $S_1, \ldots S_5$ have been stowed in the upper section 22a of the source holder 20 within guide tube 42, the winch 28 is activated to lower a cable 70 which is normally located within the guide tube 40. The cable 70 is lowered sufficiently to place its lowermost end 70a mounting an eye 72 into the region of access section 34. The hook 64a at the upper end of the cable 62 is then disconnected from the eye bolt snap 36 and connected to the eye 72 at the lower end 70a of the cable 70. The winch 28 is then activated to wind up the cable 70 and elevate the source $S_6$ supported at the lower end of cable 62 into the storage position, shown in phantom lines, in guide tube 43 within the lower section 22b of the source holder 20 in juxtaposition to sources $S_1, \ldots S_5$. With all sources $S_1, \ldots S_6$ stored within the source holder 20, the semi-cylindrical access sections 34a and 34b are re-mounted between the upper end of the pipe section 16 and the lower end of the curved pipe section 32.

To return the sources $S_1, \ldots S_6$ from storage within the source holder 20 to the active or gauging position within guide tube 52 in the radioactive source well 14, the winch 28 is activated to lower the source $S_6$ from the phantom line position within lower section 22b of the source holder 20 to a position sufficiently into the radioactive source well 14 to locate the eye 72 at the lower end of cable 70 and the hook 64aat the upper end of cable 62 in the region of access section 34. The access sections 34a and 34b are removed and the hook 64a disconnected from the eye 72 and connected to the eye bolt snap 36 at the end of the chain 38, temporarily supporting the lower source $S_6$ in the upper region of the radioactive source well 14. The winch 30 is then activated to lower the cable 60 sufficiently to locate eye 64b at the lower end of cable 60 in the access section region 34 whereupon the hook 64a the upper end of cable 62 is disconnected from the eye bolt snap 36 at the end of chain 38 and connected instead to the eye 64b at the lower end of the cable 60. The access sections 34a and 34bare reassembled and the winch 30 again activated to lower the interconnected cables 60 and 62 and their associated sources $S_1, \ldots S_5$ and $S_6$ into the source well 14 within vessel 10 to the desired level.

To minimize the required vertical dimension of the source holder 20, the coupling 64 which interconnects the upper and lower cables 60 and 62 is located slightly below the uppermost radioactive source having the greatest distance between it and the next lowermost source. In the preferred embodiment depicted in FIG. 1 since the sources $S_5$ and $S_6$ are spaced by the greatest distance, the coupling 64 is located slightly below the source $S_5$. By locating the coupling 64 in this manner, the overall length of the storage holder 20 is minimized since the linear distance between the two most distant sources supported on any single cable, which determines the minimum required length of the source holder 20, is maintained at a minimum.

With the distance between sources in the illustrative embodiment of FIG. 1 of the dimensions previously described, the distance between the two most distant sources supported on a single cable is 8 feet which is the distance between sources $S_1$ and $S_5$ Were the coupling 64 located between, for example, sources $S_4$ and $S_5$ rather than between sources $S_5$ and $S_6$, the distance between the sources $S_4$ and $S_6$ which would represent the maximum distance between the most distant pair of sources supported on a single cable, would exceed the distance between sources $S_1$ and $S_5$ thereby requiring a longer source holder 20. Since the headroom required above the top of the vessel 10, as well as the cost and complexity of the source holder and its mount, increase as the length of the source holder 20 increases, it is desirable to maintain the source holder 20 at the minimum possible length, thereby minimizing cost and size of the building required to house the vessel 10 and its associated source holder 20 when such are located indoors.

Another preferred embodiment, also useful with a cylindrical vessel 100 having a hemispherical top 100a, is shown in FIG. 2. Projecting vertically downwardly through a suitably provided opening 102 in the vessel top 100a is a radioactive source well 104. The radioactive source well 104 has its lower end 104a closed to seal the interior 104b of the radioactive source well with respect to the interior 100b of the vessel 100.

Located within the source well 104 are separate radioactive sources 106 and 108 which are independently suspended from cables 110 and 112 at different vertical elevations, such as 10 and 20 feet, respectively, below the top of the vessel. Associated with the radioactive sources 106 and 108 are separate radiation detectors $D_a$ and $D_b$, respectively. By comparing the electrical outputs of the detectors $D_a$ and $D_b$, the level 114 of the material 115 in the lower portion of the vessel can be monitored. Since the particular manner in which the detector outputs are correlated to determine material level forms no part of this invention, further discussion is unnecessary.

Located above and in alignment with the upper end 104c of the source well 104 and in vertical alignment therewith is a radiation-proof source holder 116. The source holder 116 has a lower flange 116a which is secured to a flange 104d located on the upper end 104c of the source well. Located at the upper end 116b of the source holder 116 is a hinged door 118 which facilitates access to the interior of the source holder 116. Located within the interior of the source holder 116 and extending vertically downwardly into the well 104 are a pair of guide tubes 120 and 122 in which the cables 110 and 112 and their associated sources 106 and 108 are adapted to guide when the sources are transferred between the source holder 116 and the radioactive source well 104.

To facilitate transport of the sources 106 and 108 between the gauging position within the radioactive source well 104 and the inactive or stored position within the source holder 116, winches 124 and 126 mounted on stationary platforms (not shown) are provided for reeling and unreeling the cables 110 and 112 to raise and lower the sources 106 and 108, as desired. The cables 110 and 112 extend from the winches 124 and 126 into the upper ends of the guide tubes 122 and 120 within the source holder 116 via the door 118.

In operation, the sources 106 and 108 are transferred from the operative position shown in solid lines in FIG. 2 to the inactive or stored position in the source holder 116 shown in phantom lines by activating the winches 124 and 126 until the respective sources 106 and 108 have been fully retracted into the source holder 116. Correspondingly, transfer of the sources 106 and 108 from storage within the source holder 116 to their active position within the source well 104 is accomplished by activating the winches 124 and 126 sufficiently to lower the sources 106 and 108 to the solid line positions shown in FIG. 2.

An important advantage of the embodiment of this invention is that radioactive sources, which in gauging operation must be located apart some substantial distance X, can be safely stored when not in use in a storage holder 116 having a vertical dimension only slightly more than the vertical dimension of one of the sources. As a consequence, the cost and complexity of the source holder and its mounting, as well as the headroom required above the vessel 100 for storage of the source holders when not in use, can be minimized, in turn reducing source holder and mounting cost and the size requirements for a building should the vessel be located indoors.

What is claimed is:

1. A nuclear gauging system for facilitating density-correlated measurements of the contents of a vessel having a top and a vertically disposed tubular well within which are removably positioned at least two radioactive sources in vertically spaced operative gauging orientation relative to the vessel, said system comprising:

a radiation-proof radioactive source storage holder located above the top of the vessel, said holder having an interior chamber configured to store at least two radioactive sources in juxtaposition, at least two source-hoisting assemblies operatively associated with said source holder, said hoisting assemblies each being connectable to a different one of said radioactive sources for supporting their respectively associated sources in juxtaposed stored positions within said holder, said hoisting assemblies being collectively operative to transfer said sources between juxtaposed storage in said holder and nonjuxtaposed upper and lower operative gauging positions within said well in which said sources are vertically spaced apart a predetermined distance, and said holder having a height measured in a vertical direction which is substantially less than said predetermined distance between said sources when said sources are located in said operative gauging position in said well.

2. The system of claim 1 wherein said source-hoisting assemblies each include a cable connectable to a different one of said at least two sources for independently transferring their respectively associated different sources between said stored position in which said sources are juxtaposed within said source holder and said operative gauging positions in which said sources are vertically spaced apart said predetermined distance in said well, said at least two sources being continuously suspended by their respective cables as they are transferred between their respective storage and operative gauging positions.

3. The system of claim 2 wherein said source-hoisting assemblies each further include a winch for independently reeling and unreeling their respectively associated cables to transfer their respectively associated sources between their respective storage and operative gauging positions.

4. The system of claim 1 further including:

a first cable included in one of said hoisting assemblies for selectively supporting in said holder the source which normally occupies the lowermost operative gauging position in said well, a second cable included in the other of said hoisting assemblies for selectively supporting in said holder the source which normally occupies the uppermost operative gauging position in said well, a transfer tube between said source holder and said well within which said sources move when transferred between storage in said source holder and operative gauging position in said well, said transfer tube having a selectively removable section for accessing the interior thereof, a disconnectable coupling in said first cable, said coupling when connected to said first cable being operative to support said lower source during movement of said lower source by said one hoisting assembly between storage in said holder and an intermediate position in said well, said coupling when connected to the lower end of said second cable being operative to suspend said lower source at said predetermined distance below said upper source whereby said lower source is transferred by said other hoist assembly between said intermediate position and its lower operative gauging position in said well as said upper source is transferred by said second cable between storage in said holder and its upper operative gauging position in said well, and a temporary source support located proximate said tube for temporarily supporting said lowermost source in said intermediate position when said coupling is connected to said temporary support.

5. A method of transferring first and second radioactive sources between (a) storage in juxtaposed position in a radiation-proof source holder located above a vessel and (b) upper and lower operative gauging positions vertically spaced apart a predetermined distance in a well associated with a vessel containing material with respect to which density-correlated measurements are to be made, the method comprising the steps of:

separately suspending the first and second sources from first and second independent hoisting assemblies, respectively, and while so suspended, storing the first and second sources in juxtaposed position in a source holder having a vertical dimension substantially less than the predetermined distance between the sources when in their respective upper and lower positions in the source well, and operating the first and second hoisting assemblies to collectively transfer the first and second sources between their juxtaposed storage positions in the source holder and their respective upper and lower operative positions in the well in which the sources are spaced apart vertically by a predetermined distance.

6. The method of claim 5 wherein said hoist assembly operating step includes independently operating the first and second hoisting assemblies to independently and continuously transport the first and second sources, respectively, between their juxtaposed storage positions in the source holder and their respective upper and lower operative gauging positions in the well.

7. The method of claim 5 wherein said transferring step includes the steps of:

operating the second hoist assembly to transfer the second source between a position in the source holder juxtaposed with the first source and an intermediate position in the well, temporarily transferring support of the second source between a second cable controlled by the second hoist assembly and a temporary source support located between the source holder and the well, transferring support of the second source between the temporary support and the lower end of a first cable included in the first hoist assembly which continuously supports the first source, and operating the first hoist assembly to simultaneously transport the connected first and second sources supported thereby between (a) the operative gauging condition in which the first and second sources are in their upper and lower operative gauging positions and (b) a transition condition in which the first and second sources are in their respective storage and intermediate positions.

* * * * *